United States Patent
Curtis

(10) Patent No.: US 6,347,397 B1
(45) Date of Patent: Feb. 12, 2002

(54) SYSTEM, METHOD, AND PROGRAM FOR PROVIDING AN OBJECT-ORIENTED INSTALL ARCHITECTURE

(75) Inventor: Bryce Allen Curtis, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/280,352

(22) Filed: Mar. 29, 1999

(51) Int. Cl.[7] .............................................. G06F 9/455
(52) U.S. Cl. ........................... 717/11; 717/1; 707/203
(58) Field of Search .................. 717/1, 11; 707/203, 707/204

(56) References Cited

U.S. PATENT DOCUMENTS

| | | | | |
|---|---|---|---|---|
| 5,577,244 A | * | 11/1996 | Killebrew et al. | 717/3 |
| 5,724,503 A | * | 3/1998 | Kleinman et al. | 709/318 |
| 5,835,911 A | * | 11/1998 | Nakagawa et al. | 707/203 |
| 5,860,004 A | * | 1/1999 | Fowlow et al. | 717/1 |
| 5,867,713 A | * | 2/1999 | Shrader et al. | 717/11 |
| 5,867,714 A | * | 2/1999 | Todd et al. | 717/11 |
| 5,881,236 A | * | 3/1999 | Dickey | 709/221 |
| 5,920,868 A | * | 7/1999 | Fowlow et al. | 707/1 |
| 5,930,513 A | * | 7/1999 | Taylor | 717/11 |
| 5,987,247 A | * | 11/1999 | Lau | 717/2 |
| 6,018,747 A | * | 1/2000 | Burns et al. | 707/203 |
| 6,023,586 A | * | 2/2000 | Gaisford et al. | 717/11 |
| 6,051,032 A | * | 4/2000 | Harrison et al. | 717/11 |
| 6,093,215 A | * | 7/2000 | Buxton et al. | 717/1 |
| 6,117,187 A | * | 8/2000 | Staelin | 717/11 |
| 6,131,192 A | * | 10/2000 | Henry | 717/11 |
| 6,161,218 A | * | 12/2000 | Taylor | 717/11 |
| 6,167,567 A | * | 12/2000 | Chiles et al. | 717/11 |
| 6,202,207 B1 | * | 3/2001 | Donohue | 717/11 |
| 6,205,527 B1 | * | 3/2001 | Goshey et al. | 711/162 |
| 6,205,579 B1 | * | 3/2001 | Southgate | 717/11 |
| 6,269,480 B1 | * | 7/2001 | Curtis | 717/11 |

OTHER PUBLICATIONS

Belli et al, "An approach to control different version of knowledge in object orienetd system and its application in FIREX", ACM, pp 489–499, 1990.*

Hudson et al, "Object orienetd database support for software environments", ACM pp 491–503, 1987.*

(List continued on next page.)

*Primary Examiner*—Mark R. Powell
*Assistant Examiner*—Anil Khatri
(74) *Attorney, Agent, or Firm*—Marilyn Smith Dawkins

(57) ABSTRACT

An install system, method, and program for installing a given program utilizes a containment structure having a fileset object for the program or several fileset objects for various parts of a program. Each fileset object contains install objects. An install object may be a file object, registry object, shortcut object, directory object, permissions object, library file object, dependency object, folder objects or other objects. Each fileset and install object contains the means for installing itself, uninstalling itself, logging itself to a file and recreating itself from a log file. The install process includes defining and building up a program object, for the program, which contains fileset objects which contain install objects. Install is called on the program object which effectuates an install call on each of the filesets and install objects. For each fileset object, a log is created. Then, each install object for a fileset logs itself to the particular log file of that fileset. When the fileset is finished being installed, the log file is closed. To uninstall, each fileset and the corresponding install objects are recreated by using the particular log file of the fileset object. Uninstall is called on the recreated fileset, and the install objects that were installed are uninstalled. In a preferred embodiment, the install program can be utilized across any one of many operating systems. During an install or uninstall method, platform specific code is called to perform platform specific operations or procedures on the filesets/objects.

10 Claims, 4 Drawing Sheets

OTHER PUBLICATIONS

Mahler et al, "An integrated toolset for engineering software configuartion", ACM pp 191–200, 1988.*

Ochuodho et al, "A process orienetd version and configuration management model for communication software", ACM pp 019–120, 1991.*

Simmel et al, "The Kala basket", ACM OOPSLA, pp 230–246, May 1991.*

Hall et al, "A cooperative approach to support software deployment using software dock", ACM ICSE, pp 174–183, 1999.*

Setup Factory 4.0, "User's Guide", Mar. 1998, Winnipeg Canada, IndigoRose software Design Corp., pp. 1–84.

* cited by examiner state: Build File Set ~ 1301

1302 ~ Program prog = new Program (-------) ~ 1303

1310 ~ F.6set fs = Prog.add FileSet (logfile,-,-,-,-) ~ data.zip
         1304                                    1306
                                         1305

1308 ~ fs. SetUninstall (true)
                              ~ 1309
1312 ~ fs. SetVendor ...

1314 ~ Install Object io = new Install Object ( )

1316 ~ fs. add Object (io)

1318 ~ state: checkDep

1320 ~ vector v = fs.checkDependencies( );
                                          ~ 1319

1322 ~ Copy:
                                                                    1334
fs. add Files ("*.html", c:\MyDir\html,subdirectories, "711", "owner");
              /          \              \              \        \
              1324        1326          1328           1330     1332

1340 ~ prog. checkdskspace ( )

1342 ~ prog. install ( );

FIG. 3

SYSTEM, METHOD, AND PROGRAM FOR PROVIDING AN OBJECT-ORIENTED INSTALL ARCHITECTURE

CROSS-REFERENCE TO RELATED APPLICATIONS

The present application is related to the following applications:

application Ser. No. 09/280,345, entitled "A CROSS-PLATFORM PROGRAM, SYSTEM, AND METHOD HAVING A GLOBAL REGISTRY OBJECT FOR MAPPING REGISTRY EQUIVALENT FUNCTIONS IN AN AIX OPERATING SYSTEM ENVIRONMENT";

application Ser. No. 09/280,350, entitled "A CROSS-PLATFORM PROGRAM, SYSTEM, AND METHOD HAVING A GLOBAL REGISTRY OBJECT FOR MAPPING REGISTRY EQUIVALENT FUNCTIONS IN AN OS/2 OPERATING SYSTEM ENVIRONMENT";

application Ser. No. 09/280,349, entitled "A CROSS-PLATFORM PROGRAM, SYSTEM, AND METHOD HAVING A GLOBAL REGISTRY OBJECT FOR MAPPING REGISTRY FUNCTIONS IN A WINDOWS OPERATING SYSTEM ENVIRONMENT";

application Ser. No. 09/280,371, entitled "GLOBAL REGISTRY OBJECT FOR MAPPING REGISTRY FUNCTIONS AND REGISTRY EQUIVALENT FUNCTIONS ACROSS MULTIPLE OPERATING SYSTEMS IN A CROSS-PLATFORM PROGRAM";

application Ser. No. 09/280,368, entitled "A CROSS-PLATFORM PROGRAM, SYSTEM, AND METHOD HAVING A SYSTEM INDEPENDENT REGISTRY FOR USE ON OPERATING SYSTEMS IRRESPECTIVE OF A REGISTRY EQUIVALENT";

application Ser. No. 09/280,344, entitled "A SYSTEM, METHOD, AND PROGRAM FOR ENABLING A USE OF PROPERTY OBJECT HAVING A VARIABLE FOR A PROPERTY VALUE IN A CROSS-PLATFORM PROGRAM";

application Ser. No. 09/280,346, entitled "A SYSTEM, METHOD, AND PROGRAM FOR OVERRIDING PROGRAM PROPERTIES";

application Ser. No. 09/280,375, entitled "A SYSTEM, METHOD, AND PROGRAM FOR AUTOMATIC ERROR DETECTION WHILE UTILIZING A SOFTWARE STATE MACHINE FOR CARRYING OUT THE PROCESS FLOW OF A SOFTWARE PROGRAM";

application Ser. No. 09/280,376, entitled "A SYSTEM, METHOD, AND PROGRAM FOR UTILIZING A SOFTWARE STATE MACHINE FOR CARRYING OUT THE PROCESS FLOW OF A SOFTWARE PROGRAM";

application Ser. No. 09/280,369, entitled "A SYSTEM, METHOD, AND PROGRAM FOR ENABLING A SOFTWARE PROGRAM TO AUTOMATICALLY SELECT A SYSTEM-DEPENDENT FUNCTION";

application Ser. No. 09/280,372, entitled "A SYSTEM, METHOD, AND PROGRAM FOR MAPPING A GLOBAL OBJECT TO DESKTOP ELEMENTS OF DIFFERENT OPERATING SYSTEMS";

application Ser. No. 09/280,370, entitled "A SYSTEM, METHOD, AND PROGRAM FOR PROCESSING DEPENDENCIES USING A DEPENDENCY OBJECT";

application Ser. No. 09/280,348, entitled "A SYSTEM, METHOD, AND PROGRAM FOR MODIFYING A TEXT FILE";

application Ser. No. 09/280,351, entitled "A SYSTEM, METHOD, AND PROGRAM FOR UPDATING REGISTRY OBJECTS WITH A CROSS-PLATFORM INSTALLATION PROGRAM";

application Ser. No. 09/280,374, entitled "A SYSTEM, METHOD, AND PROGRAM FOR PRESERVING BACKGROUND SETTINGS DURING INSTALL AND UNINSTALL OPERATIONS";

application Ser. No. 09/280,347, entitled "A SYSTEM, METHOD, AND PROGRAM FOR MODIFYING A LIBRARY OBJECT";

application Ser. No. 09/280,353, entitled "A SYSTEM, METHOD, AND PROGRAM FOR INSTALLATION ON DRIVES USING A DRIVE OBJECT" and application Ser. No. 09/280,373, entitled "A SYSTEM, METHOD, AND PROGRAM FOR PERFORMING PROGRAM SPECIFIC OPERATIONS DURING THE UNINSTALLATION OF A COMPUTER PROGRAM FROM A COMPUTER SYSTEM."

The above are all filed on the same day as the present application, assigned to the assignee of the present application, and incorporated by reference herein.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to install programs, and more specifically to an install program having a containment structure wherein each fileset contains at least one install object, each having capabilities for installing and uninstalling itself, logging itself to a file, and recreating itself from the log file.

2. Background and Related Art

An installer program is a software program that enables a programmer to write specific code that will allow a user to install a given application program onto the drives of a computer in a way that enables the given application program to work correctly with the computer's environment including its operating system. There are several types of installers—Java installers and operating system specific installers, e.g., Windows installers, OS/2 installers and AIX installers, etc. Many of these install programs existing today have various limitations in their functionality as discussed below.

One type of Java installer is provided by a software company known as InstallShield. Currently, this Java installer has some limitations on certain functional features. For example, the Java installer provides default panels, but the text can't be changed or configured. Also, this Java installer is not easy to customize. In other words, a programmer cannot easily add a function to the installer program that it doesn't already do. In addition, the Java installer does not provide very much registry support. A registry is a central repository for all possible information for the computer such as hardware configurations and software settings, etc. The registry enables a user/programmer to keep information about the software product. It enables a user to find out information about other products, based upon what the user/programmer put into the registry or what the user is looking for. Presently, the Java installer only works with a Windows' registry; and the support provided here is limited. For example, it does not enable the system Windows' registry to be updated directly. Instead, the keys to be updated are in a file which must be imported into the registry through a system call. It would be desirable if such a Java installer program supported multiple directories, splash screens (which are images that come up while a software product is being installed), and multiple languages instead of just English. Furthermore, it would be desirable for a given installer program to be more broadly applicable to other environments and operating systems. Although InstallShields' Java installer is tailored to Java, it is also geared somewhat for the Windows' operating system as discussed above in terms of the Windows' registry support provided. However, it does not provide specific support for other operating systems such as OS/2 or AIX.

Another Java installer is called "Install Anywhere" from ZeroG. This Java installer program also has a default panel that cannot be changed, i.e., it is not customizable in terms of the order in which the panels are to appear. Likewise, registry support is limited. A user/programmer updates a registry from a file using a "reg_edit" command. Although this installer program enables a user/programmer to add a few items into the registry, the registry cannot be queried. In addition, other registry functional features are not available. Likewise, there is no multiple directory support, and no national language support. Also, it does not support multiple operating systems, i.e., there is no OS/2 or AIX specific support.

Another approach would be to provide install APIs for Java. However, this approach is not yet available.

With respect to operating system specific installers, InstallShield provides a Windows' 32 installer. Although this installer program is widely used throughout the industry, it is based upon a proprietary scripting language that InstallShield defined. The scripting language is similar to Basic programming language. Nevertheless, a user/programmer must learn the scripting language to be able to write an install program, and it is not a real easy language to write in. When creating install programs using the Windows' 32 installer, a programmer must first learn the new language. Even then, it is difficult to write complicated install scripts with this scripting language.

For the OS/2 operating system, there is not a true architected way within the operating system itself to install. Two programs have existed for writing install code on OS/2. One of them is "Feature Installer", which has a tendency to be difficult to use. Also, it is hard to figure out how to write an install program from it. For example, it is tied into the workplace shell which requires special knowledge of SOM programming. Also, there is no compression of files. The second program is "Software Installer", which was the precursor to "Feature Installer", and is no longer supported as a product.

Also, for the OS/2 operating system, since OS/2 has Java on it, a programmer could use InstallShields' Java edition to write install code to install some types of programs. However, this does not provide much function other than just copying files.

Other than using Feature Installer, Software Installer, or a Java Installer, programmers must come up with their own way to write install code for an application program on an OS/2 machine.

Since the OS/2 operating system appears to have been architected without regard to install features, the above discussed ways for installing OS/2 application programs have no way to talk to each other. They will each have a different way of keeping track of things. As such, there is no one place to go to find out what has been installed on an OS/2 machine or to check dependencies to see what has been installed already.

For the AIX operating system, the command "installp" is used to install products. It is platform specific. It is also command line driven which is typical for the AIX operating system. Nevertheless, it appears to work well and is widely used.

As shown above, installers are tailored for a specific operating environment, e.g., JAVA, and/or operating system. As such, programmers using an installer to write install code must know and understand the specific operating environment and/or system quite well. This creates an added burden for a software company that produces many different application programs, with each application program available on many different operating systems. Separate install code must be written for each application for each different operating system. This requires a matrix of expertise-expertise in a given application, and expertise in a given operating system environment. This requires either a widely knowledgeable expert who is burdened with writing various specific versions of install code, or many different expert programmers who are essentially assigned the same task of writing install code.

Without such expertise, small software products just do not get install programs written for them for various platforms. In addition, money, resources, and time could be saved by writing an installer program only once that is applicable across all operating systems and environments.

It would also be desirable for a software manufacturer to have a common look and feel for writing install code for all of its products. In this way, as a programmer moved from platform to platform in writing install code, the programmer would recognize the interface, and know how it works. Thereby making the programmers task much easier.

Also, as shown above, there presently does not exist a functionally rich installer for Java. It is desirable to have a Java installer that is at least as functionally rich as a Window's installer.

SUMMARY OF THE INVENTION

It is therefore an object of this invention to provide a cross-platform installer that can be used to install products across multiple operating systems.

It is a further object of this invention to provide a tool kit that will enable a programmer knowledgeable in writing install programs to be able to automatically write an install program that is applicable across other operating systems and environments without having to be an expert in each of the operating systems and environments.

It is a further object of this invention to provide a common look and feel for writing install code for all products.

It is a further object of this invention to provide a full function installer.

The installer tool kit of the preferred embodiment of this invention supports the Windows 32 operating systems including Windows 95, Windows 98 and NT 4.0. It also supports OS/2 Warp 4.0, OS390, AIX 4.1 and higher versions, Solaris and Linux 4.2. Although the structure of the preferred embodiment enables support for any given operating system or environment, future embodiments or further enhancements to the present preferred embodiment will enable full support for other operating systems such as NT 5.0, HP-UX and AS/400.

In the preferred embodiment of this invention, the functions provided by the installer tool kit are script based (Java).

This enables the developer who is writing an installer to do whatever the developer wants to do. The developer is not limited in having panels occur in a particular order, or in not being able to make the calls that need to be made, or in not being able to perform a desired function such as configuring files, etc. To accomplish this, the tool kit was written using Java, although any script-based language would provide this same flexibility. As such, anything that Java has available in it is available to the developer. Furthermore, the tool kit enables a developer to perform functions on files and directories, e.g., to copy, read, create, modify, version and to batch files. With respect to registry functions, the tool kit enables a developer to write an install program that can read, create, modify, delete, and enumerate registries for the Windows operating system which is the only operating system that has a registry. These same functions are provided for all other operating systems that do not have a registry, but do have registry equivalent functionality.

Other functions of the tool kit include i) providing install property objects that contain variables as values that become defined for a specific operating environment; ii) enabling a property value to be temporarily overridden; iii) a software state machine that enables a programmer to easily customize an install program by merely adding, deleting, or changing the various states that contain the functions and flow of control of the program; iv) automatically detecting a programming error if a programmer incorrectly specifies a non-existent state within the state machine; v) automatically selecting a system-dependent function; vi) a containment structure consisting of program object/fileset objects/install objects where each fileset object and install object contains means to install and uninstall itself and to log itself; vii) enabling the management of folders, shortcuts and icons, viii) enabling environment variables to be read, created, modified and deleted, ix) providing dependency checking of prerequisite programs during both install and uninstall, and x) providing various logs, e.g., a log for keeping track of what is being installed, and a log that reports the progress of install. Logs are used for both the install and uninstall process. Furthermore, these logs are human readable which allows them to be checked, e.g., after a silent install, to ensure that a file has installed successfully. The tool kit also enables multiple destination directories to be installed from multiple source directories. For example, there can be multiple components of file sets included in an install where a file set is a separately installable/uninstallable piece of code or set of files.

Other features include a) a progress bar that shows the status during an install, b) splash screens which can be displayed during an install, c) national language support, d) the ability to perform unattended install from install scripts, and e) an install wizard. There are also twenty or so defining default panels that are available. It is also easy for a programmer to add a programmer's own panels without a lot of effort.

More specifically, the system, method, and program of the preferred embodiment of the invention provides a program containment structure having at least one fileset, and with each fileset having at least one install object. An install object may be a file object, registry object, shortcut object, directory object, permissions object, library file object, dependency object, or folder objects. Other types of objects are also possible. Each fileset and install object knows how to install itself, uninstall itself, log itself into a file, and recreate itself from a log file. As each fileset and object are installed, they each get written to a log. To uninstall, the install objects and filesets get rebuilt from the log just like they were when they were installed. An uninstall method is called which goes through and uninstalls each install object and fileset. Furthermore, during an install or uninstall method, platform specific code is called to perform platform specific operations or procedures on the filesets/objects being installed or uninstalled. The platform specific code can override install or uninstall for a specific object or fileset. Otherwise, it can let install and uninstall proceed independently of any platform specific code.

These features are not known in previously known Java installers. Typically, Java installers only install files.

Preferred embodiments of the invention include a) an installer tool kit, including a system, method, and program, that enables the creation of install programs for any one of a plurality of operating systems as described herein, b) an install program that can be used for multiple platforms to install an application program on a specific operating system; i.e., the same install program can be used to install a similar application program on different operating systems, c) a method for carrying out the functions of the install program, and d) a computer system running the install program on a specific operating system for installing an application program. Other more general embodiments include a) any tool kit for enabling the creation of programs that are capable of running on more than one operating system, b) any program that is enabled for multiple platforms, c) methods carried out by cross platform programs, and d) a computer system running a program that is enabled for multiple platforms.

BRIEF DESCRIPTION OF THE DRAWINGS

FIG. 3 illustrates various states for building a program containing filesets and objects, checking dependencies, and checking disk space as a prerequisite to installing or uninstalling filesets and object.

DETAILED DESCRIPTION

The following description and the accompanying drawings illustrate a preferred embodiment of the present invention. It is understood that other embodiments may be utilized, and structural and operational changes may be made, without departing from the scope and spirit of the present invention.

Figure 1:
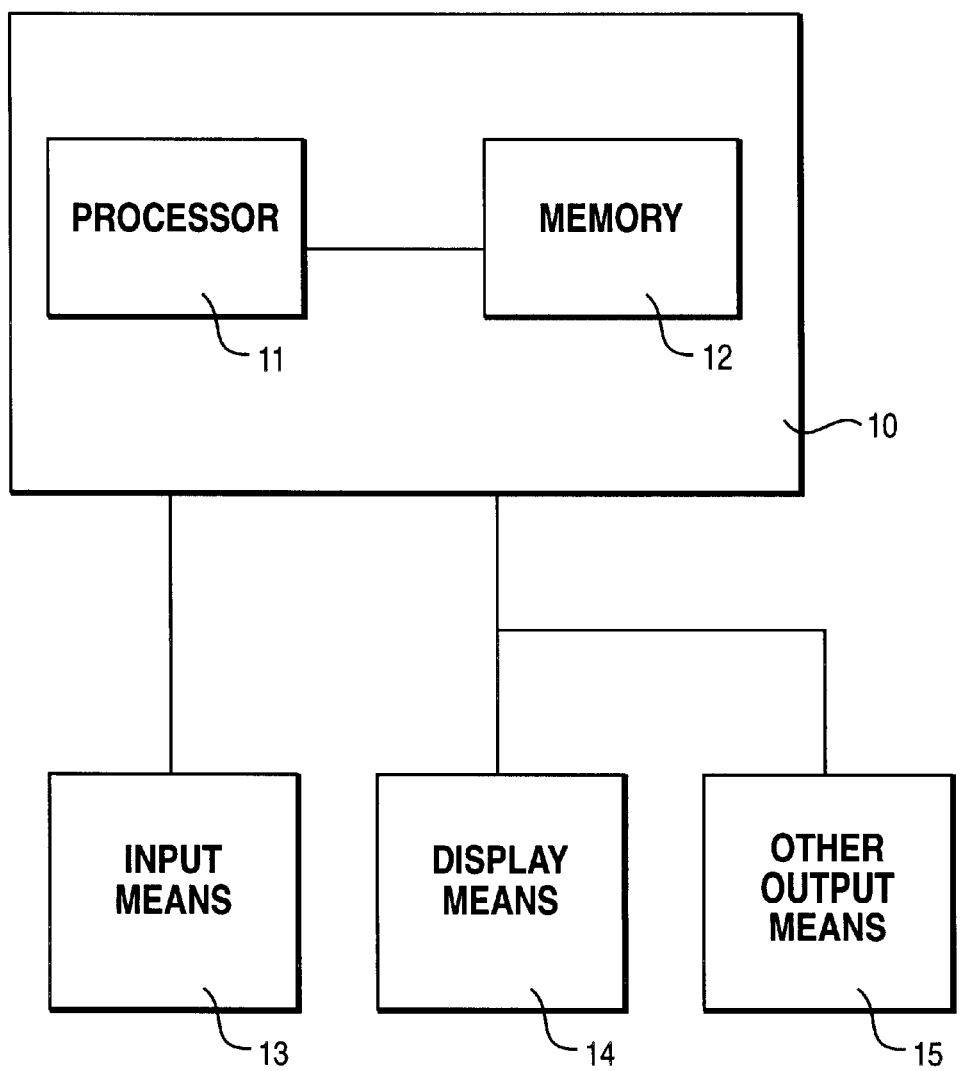
FIG. 1 depicts a block diagram of a data processing system in which a preferred embodiment of the present invention may be implemented.

With reference to FIG. 1, a block diagram of a data processing system 10, i.e., computer system, in which a preferred embodiment of the present invention may be implemented is depicted. The computer includes a processor 11 and memory 12. The computer 10 may be, but is not limited to, a personal computer, workstation, or a mainframe. The computer system also includes input means 13 such as a keyboard and/or mouse and/or track ball and/or light pen and/or pen-stylus and/or voice-sensitive device and/or touch-sensitive device, and/or other pointing devices and/or other input means. Also included are display means 14 such as a display monitor and other output means 15 such as printers, etc. Memory 12 includes volatile or nonvolatile storage and/or any combination thereof. Volatile memory may be any suitable volatile memory device known in the art, e.g., RAM, DRAM, SRAM, etc. Nonvolatile memory may include storage space, e.g., via the use of hard disk drives, for programs, whether or not the programs are being executed. The programs in memory 12 include an operating system program and application programs, such as an install program or an installer tool kit. If the memory 12 is comprised of volatile and nonvolatile memory devices, then data and programs may be swapped between the volatile and nonvolatile devices in a manner known in the art.

The exemplary embodiment shown in FIG. 1 is provided solely for the purposes of explaining the invention and those skilled in the art will recognize that numerous variations are possible, both in form and function. For instance, any one or more of the following—the processor and/or memory and/or the input/output devices—could be resident on separate systems such as in a network environment. Any such variation to FIG. 1 is within the sprit and scope of the present invention. The computer system and parts thereof depicted in the figures and described below, and the Java implementations described herein, are provided solely as examples for the purposes of explanation are not intended to necessarily imply architectural limitations. Those skilled in the art will recognize the numerous programming languages which may be utilized, all of which are believed to be embraced within the spirit and scope of the invention.

Figure 2:
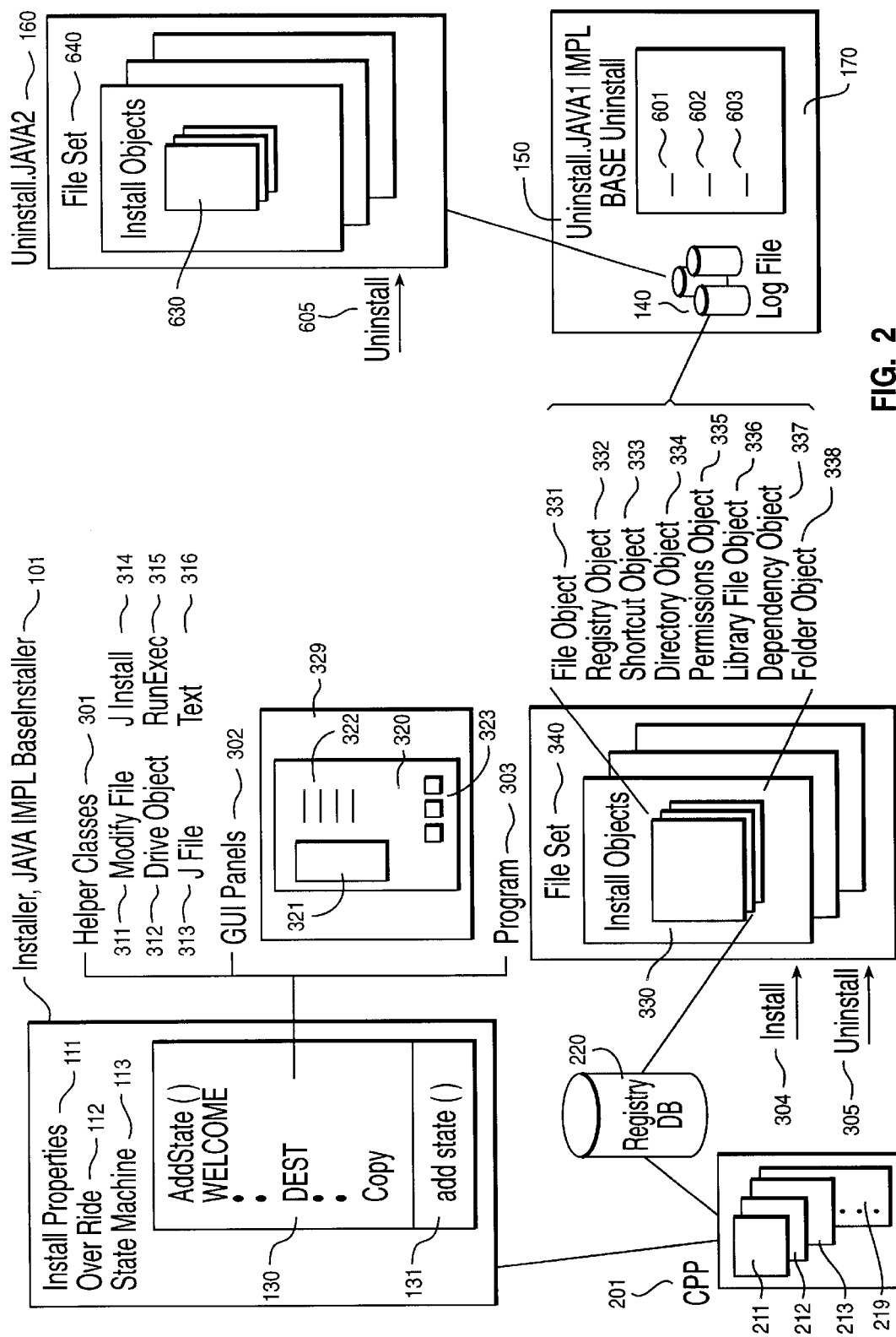
FIG. 2 depicts the flow and structural components of a cross-platform installer program.

The system, method and program of a preferred embodiment of this invention enables the creation of a cross-platform installer program in accordance with the structural components and flow of FIG. 2.

A script, referred to herein as "Installerjava", 101 FIG. 2, is used to run the install engine. The script implements the base installer class in Java. Within the script 101 there are the following entities: a) install properties 111; b) an override function 112; c) and a state machine 113. Within the state machine 113, there are various states 130 such as a welcome state, a destination state, a copy state, etc. This state machine includes an "add state method" 131 which is further used to check for errors. The following process takes place when the base installer class starts running: a) the properties are set up, 111, b) the properties are overridden, 112, and then c) the state machine 113 is executed. The program stays in the state machine until exited out. At exit, the program has either been successfully or unsuccessfully installed.

Within any given state 130 there are several objects. There are helper classes 301, GUI panels 302, and a program object 303.

Within the helper classes 301, there is a modify file class 311, a drive object class 312, a J file class 313, a J install class 314, a run exec class 315, and a text class 316. The modify file class 311 and drive object 312 will be discussed in more detail either below or in a related application. J file 313 is a class that enables actions to be performed with files and directories. J install 314 contains methods that enables access to environment variables and enables other similar activities. Run exec 315 is a class that enables the running of operating system calls. Text class 3 16 is a class that is used to handle national language support.

An example of a GUI panel 320 is shown in FIG. 2. There may be an image 321, text or controls 322 and buttons 323 such as back, next or cancel. The GUI panels 320 all extend a class calling a wizard dialog. They are displayed in a mainframe class 329. The mainframe class manages the screen display, e.g., gradient background color, text. It also manages the splash screens and titles and other similar items including where they are being displayed. In other words, it manages the background image and screen image upon which the dialogs are displayed.

Within any given state there is also the heart of the install program, which is a program object 303 having file set objects 340. Within each file set object 340 there are multiple install objects 330. There are several types of install objects—file object 331, registry object 332, shortcut object 333, directory object 334, permissions object 335, a library file object 336, a dependency object 337, and folder object 338. Other objects are also possible. All of these objects extend or implement install objects 330. In addition, all of the install objects have certain methods on each of them. In particular, each install object knows how to install or uninstall itself, how to log itself, and how to internalize from a log, i.e., how to build itself back up again from reading from a log.

The install process that the script 101 enables includes running the state machine 113 through various states 130 which cause different events to take place.

For example, a GUI panel may pop up as part of the welcome state. During a destination state, another GUI panel may pop up on the screen that asks where the product is to be installed. The install properties 111 may be used in the destination state by having a destination panel set a particular destination directory name of an install property to a particular directory. During the copy state, the program object 303 is built up with all of the install objects 330 in them. The install command 304 is then called on the program object. Each one of the file sets 340 and install objects 330 contains an install method. As such, by calling install 304 on the parent object, i.e., the program object 303, the program object goes through and calls install on all of the other objects 340, 330 that it contains.

Likewise, the uninstall process is also enabled by the script 160. For uninstall, there is an uninstall method on the file set 340 and on all of the other install objects 330. By calling uninstall 305 on the program 303, everything becomes uninstalled, i.e., the program, file sets and install objects.

It should be noted that during an install, each one of the install objects 330 gets written out to a log file 140 which is put into a particular directory. At the same time that the install objects 330 log themselves to the log file, there is also another 30 file, called "uninstall.Java1" 150 which implements a "base uninstall" class. It has several methods in it that get called at different points during uninstall. During install, the log 140 and "uninstall.Java1" 150 information are built. The log file 140 and "uninstall.Java1" 150 are in the file system 170 on a particular directory. If it is uninstalled, the first thing that happens is that it reads into "uninstall.Java2" 160 the log files 140 and recreates the same structure 160 as the file sets 340 and install objects 330. It does not recreate the program object 303, but rather it recreates the structure of everything contained within the program object, i.e., file sets 640 and install objects 630. As a result, recreated from the log file 140 is a file set with all of the install objects that it contains. There is one log file for each file set. Directory 170 can be thought of as a container just like the program directory 303 is a container for the file set 340 and install objects 330.

"Uninstall.java2" 160 builds up the file sets 640. Uninstall 605 is called by the uninstaller, and it goes through each file set and install object and uninstalls itself. During the uninstall of each file set 640, the base uninstaller class 150 is called at the beginning and at the end of the file set. Therefore, at the beginning and ending of copying a file set 640, the installer makes a call to the base uninstaller class 150 at appropriate points 601, 602, 603, as discussed below.

This allows certain things to happen when the file set is being uninstalled.

There are certain platform specific operations that are taking place throughout the different objects, i.e., the helper classes 301, install objects 330, etc. Therefore, there is a platform specific module/interface. It is referred to herein as CPP 201. It defines a set of methods, that are representative of different operating systems, for functions that need to take place for an install. There are several different CPPs 211, 212, 213, . . . 219, etc., one for each operating system. For example, CPP Win 32, CPP OS/2, CPP Solaris, CPP Linux, and CPP AIX. There is also a CPP default. If the operating system is not implemented through a CPP, the CPP default is used. This CPP 201 is the platform specific code for the installer.

Since most platforms, i.e., operating systems, do not have a registry, a platform independent registry database class 220 is created which ties the platform specific code 201 with registry objects 332. The registry database 220 implements the registry function for those platforms which do not have a registry.

The above description presented an overview of the install program and how it works. The following describes, in more detail, various parts of the overall structure and process described above.

More specifically, the following describes an object oriented install architecture which includes the program object 303 and log file 140. Within one or more of the states 130, a program object 303, various file set objects 340, and install objects 330 are defined and built up. First, a program object 303 is created. Then, fileset objects 340 are added to the program object 303; and different install objects 330 are added to each fileset object 340. Once the program object 303, fileset objects 340 and install objects 330 are completely built up, the call "install" 304 on the program 303, will call "install" on the fileset object 340 and all of the install objects 330. Then, the fileset object 340 creates a log 140. Each of the install objects 330 then logs to the particular log file 140 of the fileset object. When a fileset is done being installed, the log for that fileset is closed. The process continues with the next fileset. The next fileset creates a new logfile and the process repeats.

During uninstall 305, the logfile 140 for each fileset 340 is used to recreate the fileset 640 and the install objects 630. Uninstall 605 is then called on it, and it uninstalls all of the install objects that were installed. Then at different points within a fileset 640, such as at begin and end, "uninstall" 605 calls two different methods 601, 602 in the uninstall Java class 150 that is specific to this program.

Within the state machine 130, a preferred embodiment of the invention has a state called "build fileset" 1301. Within this "build fileset" state, one of the first steps creates a program object 1302. The program object contains several parameters 1303 such as program name, program version, and where the directory is, that is, the directory where all of the log files will go into. Once the program object is created, filesets are added to it, 1304. The code which adds filesets returns a fileset object, 1310. A fileset object contains the log file name 1305. The directory was specified by the program object, and the log file name itself is specified by the fileset object. In addition to the log file name, the fileset object contains the fileset name, fileset version, the location of the source files such as in a zip file or in a directory structure, 1306. The fileset object also contains a variable true or false for identifying whether or not items are backed up when the install is taking place over the top of an existing program. In this way, if the latest version of the program is being uninstalled, the previous version that was previously installed underneath is now on top and available.

For each fileset, there is a method call "SetUninstall" 1308 which allows a user to selectively uninstall a fileset; i.e., a part of the program. For example, there may be several pieces or segments to the program such as documentation, base program files, a tutorial, etc. If the base is uninstalled, then everything gets uninstalled. However, if it is desired that only the tutorial be uninstalled, then the "SetUninstall" method for the tutorial fileset can be set to true 1309. This allows only the tutorial fileset to be uninstalled without uninstalling the entire program.

In other preferred embodiments, other items can be added to the file set such as vendor information name, URL, etc. 1312.

A user/programmer can new up any one of these install objects 1314, and add it to the fileset to install it 1316. For example, to install a program, the process would new up a file object and add it to the fileset which would represent a group of files to be installed.

As shown, a new program object was created, 1302, and multiple filesets can be added to it just by repeating statement 1310. Further statements, such as 1308, 1312, 1316, do whatever a programmer wants to do to that fileset.

There are many different install objects that can be added to a fileset of e.g., dependency objects, registry objects, etc.

To add a dependency object, a new state called "CheckDep", i.e., check dependencies could be created 1318. Within that state, a "fileset.checkDependencies" method 1319 would return a vector 1320 of all of the dependencies that are not yet installed. Dependencies are added to a fileset in the area of the program such as statements 1308, 1312. Then, with the one method call 1319 in the fileset, the program knows how to go through and check to see if everything that it requires to run is already installed. If everything it needs is not installed, then several tasks are undertakes as discussed separately below. If all of the dependencies are met then the program enters a copy state. It should be noted that in other embodiments, the states do not necessarily have to be unique, i.e., various functions can be combined into a single state, etc. However, for greater ease and flexibility, unique states having a fine granularity were defined in a preferred embodiment.

The copy state 1322 is described as follows. There is a method on a fileset called "addFiles( )" 1324. this is a shortcut way of newing up a file object, i.e., getting a file object, and adding it as in method "addObject(io)" 1316. For example, a programmer may desire to add all of the programmer's html files 1326 that were in the source to some directory called C:myDir/html, 1328. In doing this, the programmer has some options. The programmer may copy all sub directories 1330; and when they are copied, the programmer may want to have a set of permissions 1332 and some owner or group of owners 1334. This is the same type of information that is in the file object 1306. However, there are some helper methods in the fileset class that enables a programmer to do this in one line rather than newing up a file object and then adding it.

More specifically, the addFiles( ) method 1324 instructs the install engine to look into the directory "myDir" which was specified in one of the parameters 1306 in adding a fileset object such as a parameter called data.zip. The install engine looks in the data.zip file, parses through it, and anything that matches the key 1326 or file name *.HTML is copied into the specified directory 1328, c:\myDir\html. As such a shortcut is set up. Other shortcuts can also be set up to perform other functions.

Checking disk space can also be performed 1340. Because the program knows all of the filesets that it contains, the program asks each fileset how much space it needs and performs a check to verify that there is enough disk space. If it is determined that there is enough disk space, a program install is performed 1342. "Prog.install" goes through all of the filesets that have been added to it 1310, 1308, 1312, through the "add fileset( )" method 1304, and performs an install based on that. To complete this process, the install creates the logfiles in the directory.

Figure 4:
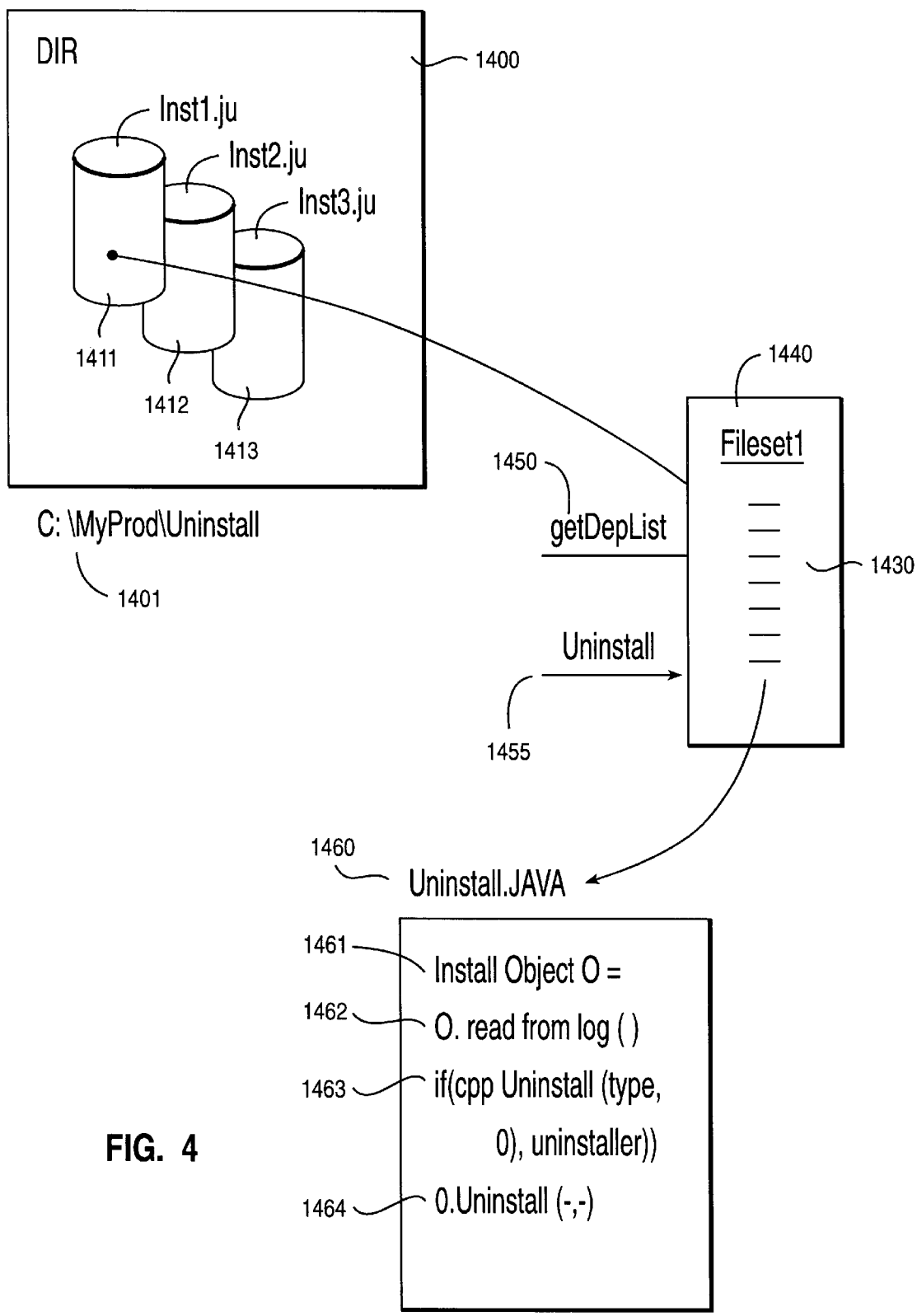
FIG. 4 illustrates the uninstall process.

For uninstall, reference is made to FIG. 4. A directory 1400, having a path name "c:\myprod\uninstall" 1401 may have several files shown as instl ju 141 1, inst2.ju 1412 and inst3.ju 1413 which represent three different filesets that make up the program "MyProd". The directory name "C:\myprod\uninstall" 1401 is passed to "uninstall". The uninstall process goes to the directory, and looks for all of the files that end in a designation representing a file to be uninstalled such as "ju". Each such file is read in, and a new fileset 1440 is created for each one. As each file 1411–1413 is further read, there are install objects that are listed within each fileset. New install objects 1430 are then created. Once this is completed, what exists are filesets 1440 and install objects 1430 that are the same 340, 330 (FIG. 2) that were created during install. There is the same fileset, it is set up in the same way, with the same install objects, and they have the same methods on them. As such, there is a method on the fileset 1440 called "get dependency list" 1450 which checks to see if any of the programs that have been installed depend upon this fileset 1440. If there are programs that have been installed that depend upon a fileset 1440 that has been created during the uninstall process, then such a fileset should not be uninstalled. A message appears to the user during the uninstall process that warns against deleting the fileset because such a deletion could cause a program currently installed on the system to malfunction. However, if no such dependencies exist for that fileset, then the uninstall method 1455 can be called on the fileset. The uninstall method goes through and calls uninstall on each install object within the fileset. Each install object removes itself. Then the fileset cleans itself up when it is removed by deleting its logfile 1411. When the logfile is gone, the uninstall process repeats by going to the next fileset and doing the same uninstall process.

As part of the flow of uninstall in the uninstall class file, e.g., uninstall.Java 1460, a new instance of an install object 1461 is created which is based upon what has been read in from the log of the log stream 1462. A "CPP uninstall" method 1463 is performed. The type of the object, the object, and the uninstaller that is being used is passed to the "CPP uninstall" method. Most importantly, the object itself is being passed. This enables the platform specific module 201 (FIG. 1) an opportunity to see what it is that is being uninstalled, and to override it or cancel it out. If the return "CPP Uninstall" 1463 is true, then that indicates that the platform specific module has handled the process of uninstalling the object and that the main uninstall process should not continue with uninstalling that particular install object.

As such, before the uninstaller calls the uninstall method 1455 for each install object 1430, the uninstaller goes over to check with the platform specific code, CPP, 201 FIG. 2, and passes in the object that it is getting ready to uninstall. The CPP module has an opportunity to override the uninstall process by returning a result that indicates that the install object should not be uninstalled by the uninstall method.

Statement 1463, FIG. 4, returns true if the CPP module handled the install object and the install object should not be handled by the uninstall method, i.e., the install object should not be uninstalled. If a not or false is returned, then the uninstall method will go ahead and uninstall the object since the platform specific module did not handle it. "O.uninstall" 1464 will call the uninstall method on these install objects. The install objects will then uninstall themselves.

Events similar to these also happen during the install process. For example, for each install object, a platform specific "install" method is called, "CPP.install" that passes the same or similar information as for the CPP uninstall method 1463 such as the type of object, the install object itself, and the installer. The platform specific install code looks at that install object, and has an opportunity to do something with the install object. Again, either a true or false is returned to indicate whether the platform specific code handled the install object and the install method 304 (FIG. 2) should not install the install object or whether the platform specific code did not handle it, or do anything with it, and therefore the install method 304 can go ahead and install it.

The above described technique is useful and needed when one tries to simulate an install on a platform specific operating system's install mechanism. For example, for the AIX operating system, all of the programs that are to be installed have to be first collected so that they can be added to a database. The database has to be updated with all the programs or all the files that were copied onto the system so that they can be considered to be installed correctly. This feature is useful for install and uninstall.

```
Object-oriented install architecture
----Installer.java
    //Build file set
    //This state creates a file set that will be installed during
    //the "Copy" state. If you want to do dependency checking, this
    //is the place to do it.
    else if (state.equals("BuildFileSet")) {
        //show(null);
        //-----------------------
        //Create program object
        //-----------------------
        prog = new Program(
                this,
                "Install Toolkit for Java Demo Program",
                "1.0",
                installp.get("destinationDirectory")+"UnInst");
        //-----------------------
        //Create Base fileset
        //-----------------------
        fs1 = prog.addFileSet(
                (String)installp.get("logFileNameBase"),
                "Base",
                "1.0",
                "data.zip",
                backup);
        fs1.setUninstall(true);
        //Use the same look for uninstall
        fs1.mainframe = frame.getProperties();
        //Set vendor info for fileset
        fs1.setVendorName();
        fs1.setVendorPhone();
        fs1.setVendorEmail();
        fs1.setVendorURL();
        fs1.setUpdateURL();
        fs1.setVendorAddr();
        fs1.setVendorFax();
        fs1.setDescription("Base install for the Install Toolkit for Java Demo Program.");
        fs1.addInfo("My Info", "This is my vendor-specific place to add
```

-continued

```
        information.");
    //Add dependencies for installed products
    DependencyObject dob;
        fs1.addDependency("Install Toolkit for Java 1.0", "Install Toolkit
for Java", "1.0", "", "", "", "my install script", "silent", "url");
        fs1.addDependency("JDK 1.1", "JDK", "1.1", "", "", "WIN32",
"my install script", "silent", "url");
        fs1.addDependency("JDK 1.1", "JDK", "1.1", "INV_Java11", "",
"OS/2", "my install script", "silent", "url");
    //Check for files
        fs1.addDependency("Config.sys file", "c:\\config.sys", "");
    //Check for registry entries
        RegistryObject cr = new RegistryObject();
        cr.setKeyRoot(CPPWIN32.HKEY_LOCAL_MACHINE);
        cr.setKeyName("Software\\Microsoft\\Windows\\CurrentVersion\\
Uninstall");
        dob = fs1.addDependency("RegistryCheck", cr, "", "WIN32");
        dob.setInstallInfo("Here is the install information");
    //------------------------
    //Create Tutorial fileset
    //------------------------
        fs2 = prog.addFileset(
                (String)installp.get("logFileNameTutorial"),
                "Tutorial",
                "1.2",
                "data.zip",
                backup);
        fs2.setUninstall(true);
    //Use the same look for uninstall
        fs2.mainframe = frame.getProperties();
    //Set vendor info for fileset
        fs2.setVendorName();
        fs2.setVendorPhone();
        fs2.setVendorEmail();
        fs2.setVendorURL();
        fs2.setUpdateURL();
        fs2.setVendorAddr();
        fs2.setVendorFax();
        fs2.setDescription("Tutorials install for the Install Toolkit for Java
Demo Program.");
        state = "Prereq";
    }
    //Prerequisites screen
    else if (state.equals("Prereq")) {
        //Check dependencies
        String sDep = "";
        Vector listDep = fs1.getDependencies();
        Vector dep = fs1.checkDependencies();
        if (listDep.size() > 0) {
            . . .
        else {
            state = "Copy";
        }
    }
    //Copy files
    //This state takes a file set and identifies what files, folders,
    //shortcuts, and registry entries should be created. During
    //this state, a progress indicator is shown.
    else if (state.equals("Copy")) {
        String r = "";     //result of the operation
        //Identify files to be copied
        fs1.createDirectory((String)installp.get("destinationDirectory"),
"", "");
        fs2.createDirectory((String)installp.get("destinationDirectory"),
"", "");
        fs2.addFiles("tutorial\\*.*",(String)installp.get("destination
Directory"), "", "711", "staff");
        fs1.addFiles("images\\*.*",(String)installp.get("destination
Directory"), "", "711", "staff");
        fs1.addFiles("screenshots\\* .gif", (String)installp.get
("destinationDirectory"), FileSet.SUB_DIRECTORIES, "711", "staff");
        fs2.addFiles("tutorial\\tutorial.html", (String)installp.get
("destinationDirectory"), FileSet.NO_ROOT_PATH, "711", "staff");
        fs1.addFiles("*.html", (String)installp.get("destinationDirectory"), "",
"711",
"staff");
        fs1.addFiles("*.txt", (String)installp.get("destinationDirectory"), "",
"711", "staff");
        fs1.addFiles("*.ico", (String)installp.get("destinationDirectory"), "",
```

-continued

```
"711", "staff");
        //shared library
        fs2.addFileToLibrary("tutorial\\tutorial.html",
(String)installp.get("destinationDirectory") + "bc.a", "", "");
        fs1.createDirectory((String)installp.get("destinationDirectory")+
"TEMP", "711", "staff");
        fs1.setPermissions((String)installp.get("destinationDirectory") +
"Readme.txt", "777", "staff");
        //set a registry efltry
        RegistryObject reg = new RegistryObject();
        reg.setKeyRoot(install.HKEY_LOCAL_MACHINE);
        reg.setKeyName("Software\\IBM\\ITJDemo\\Version");
        reg.setKeyValue("1.0");
        fs1.addRegistry(reg);
        String newFolder = (String)installp.get("folder");
        //Don't add folder if none selected or not supported
                if (newFolder.length() > 0) {
            FolderObject fo = fs1.addFolder(newFolder);
            fo.setAttributes("DEFAULTVIEW = DETAILS");
            ShortcutObject scReadme = new ShortcutObject();
            scReadme.setSource((String)installp.get("destinationDirectory") +
"DemoReadme.txt");
            scReadme.setFolder(newFolder + fsc + "Readme");
            fs1.addShortcut(scReadme);
            ShortcutObject scUninstall = new ShortcutObject();
            scUninstall.setSource(prog.uninstallDir + prog.uninstallFile);
            scUninstall.setArgs(prog.uninstallArgs);
            scUninstall.setWorkdir(prog.uninstallDir);
            scUninstall.setFolder(newFolder + fsc + "Uninstall");
            scUninstall.setIcon(prog.uninstallDir + "undo.ico");
            scUninstall.setIconIndex(0);
            fs1.addShortcut(scUninstall);
        }
        //Check to see if there is enough disk space
        long diskSpace = fs1.getDiskSpace() + fs2.getDiskSpace();
        fs1.setStartPercent(0);
        fs1.setEndPercent((int)(fs1.getDiskSpace()*100/diskSpace));
        fs2.setStartPercent((int)(fs1.getDiskSpace()*100/diskSpace+1));
        fs2.setEndPercent(100);
        if (!prog.checkDiskspace()) {
            r = TEXT.get("FileSet.diskSpaceError");
        }
        else {
            //Install files
            r = prog.install();
        }
        . . .
    }
OO Install - internalize objects from log
---- from Uninstaller.java
    //Create all fileset objects in the log directory
    logDir = Jfile.formCorrectDirectory(logDir);
    File udir = new File(logDir);
    String[] files = udir.list();
    if (files == null) {
        System.out.println("Directory" + logDir + "not found");
        System.exit(0x812);
    }
    boolean abort = false;
    //Look at each file in list
    for (int i = 0; i < files.length; i++) {
        if (files[i].endsWith("ju")) {
            //New up fileset object
            FileSet fs = new FileSet(logDir + files[i]);
            //Add to list of filesets to uninstall
            fileSets.addElement(fs);
            //Set program name
            programName = fs.progName;
            //Check to see if the filesets to be uninstalled have any
            //other programs dependent upon them
            Vector dl = fs.getDependencyList();
            if (dl.size() > 0) {
                System.out.println(fs.progName + "should NOT be uninstall
since other programs depend upon it. The dependent programs are: " + dl);
                Jfile.log(fs.progName + "should NOT be uninstall since
other programs depend upon it. The dependent programs are: " + dl);
                fs.setInstall(false);
                abort = true;
            }
```

-continued

```
   }
 }
--- from FileSet.java
//------------------------
//If other object, then delete it
//------------------------
else {
    InstallObject o = null;
    try {
        o = (InstallObject)Class.forName(type).newInstance();
        o.readFromLog(fLog);
        //Make call to CPP for processing
        if (o.doUninstall(removeAll)) {
            if (!cpp.uninstall(type, o, this)) {
                o.uninstall(this, removeAll);
            }
        }
    }
    //If there is an error newing up an object, then
    //skip over it
    catch (Exception e) {
        String s = fLog.readLine();
        Jfile.log(TEXT.get("Uninstall.logError") + ":" + type + "=" + s);
    }
  }
}
Interface InstallObject
public interface InstallObject
```

Any objects that are to be installed must implement this interface object. The install ( ) method is called during install, and the uninstall( ) method is called during uninstall. They must be able to externalize themselves to a log stream, and internalize themselves from a log stream with enough information to be able to delete themselves.

Method index
  doUninstall(boolean)
    Find out if this object will be uninstalled given the removeAll value.
  get(Comment( )
    Get the comment to be displayed during installation of this object
  getInputStream( )
    Get the input stream from which this object can be read.
  getLogOutputStream( )
    Get the log file to use to log this object
  getsize( )
    Get the amount of disk space this object uses.
  install(FileSet)
    Install this object.
  readFromLog( )
    Read this object from the install log and initialize the variables
  readFromLog(RandomAccessFile)
    Read this object from the install log and initialize the variables
  setComment(String)
    Set the comment to be displayed during installation of this object
  setInputStream( InputStream)
    Set the input stream from which this object can be read.
  setLogOutputStream(RandomAccessFile)
    Set the log file to use to log this object
  setSize(long)
    Set the amount of disk space this object uses.
  uninstall(FileSet)
    Unconditionally uninstall this object.
  uninstall(FileSet, boolean)
    Uninstall this object.
  writeToLog( )
    Save this object to the install log specific in setLogOutputStream.
  writeToLog(RandomAccessFile)
    Save this object to the install log specified by log.

(Copyright of the IBM Corporation, 1998)

The present invention has been described above in the context of a fully functional system, method, and computer program; all of which are capable of being contained within one or more physical devices. The program of this invention is capable of being made, used, sold and distributed in the form of a computer usable medium of instructions in a variety of forms. The present invention applies equally regardless of the particular type of signal bearing media actually used. Examples of computer usable media include volatile memory (e.g., RAM, DRAM, SRAM); nonvolatile memory such as read only memories (ROMS) or erasable, electrically programmable, read only memories (EPROMs), or recordable type media such as floppy disks, hard disks and CD-ROMs; and transmission type media such as digital and analog communication links.

While the invention has been particularly shown and described with reference to a preferred embodiment, it will be understood by those skilled in the art that various changes in form and detail may be made therein without departing from the spirit and scope of the invention.

I claim:

1. An install program, on a computer usable medium, comprising:
    at least one fileset object;
    a plurality of install objects for each fileset; and
    means within each fileset object and each install object for installing itself, uninstalling itself, logging itself to a file and recreating itself from a log file.

2. The install program of claim 1 further comprising means, within the fileset object, for enabling an install of a later version of a program on top of an earlier version of the program and having the earlier version automatically available when the later version is uninstalled.

3. The install program of claim 1 wherein each of the at least fileset object contains a method for enabling a user to selectively uninstall a given one of the at least one fileset whereby only the selected fileset is uninstalled without uninstalling an entire program.

4. An install program, on a computer usable medium, comprising:
    a plurality of filesets;
    at least one install object for each fileset;
    an install method for installing each install object and fileset by using means within each fileset and install object for installing itself;
    means within each fileset and install object for writing itself to a log after being installed;
    an uninstall method for uninstalling each install object and fileset by using means within each fileset and install object for uninstalling itself;
    means, within the install method, for calling platform specific code to perform platform specific operations on at least one of the filesets and install objects;
    means within the platform specific code for overriding install for a specific object of a fileset;
    means, within the uninstall method, for calling platform specific code to perform platform specific operations on at least one of the filesets and install objects; and means within the platform specific code for overriding uninstall for specific object of a fileset.

5. A computer implemented method for installing a program onto computer storage, the method comprising:
   defining and building up a program object, for the program, containing at least one fileset object, for at least a part of the program, which contains a plurality of install objects;
   calling install on the program object thereby effectuating an install call on each of the at least one fileset object and each of the install objects; for each fileset object:
   i) creating, by the fileset, a log;
   ii) logging, by each of the install objects, itself to the particular log file of the fileset object;
   iii) closing the log for a given fileset after the given fileset is done being installed; and
   repeating steps i), ii) and iii) for each fileset.

6. The computer implemented method of claim 5 further comprising:
   recreating each fileset and the install objects by using the particular log file of the fileset object;
   calling uninstall on the recreated fileset; and
   uninstalling the plurality of install objects that were installed.

7. A computer system having means for installing a program onto computer storage of the computer, the system comprising:
   means for defining and building up at least one fileset;
   means for defining and building up at least one install object for each fileset;
   an install method for installing each install object and fileset by using means within each fileset and install object for installing itself;
   means within each fileset and install object for writing itself to a log after being installed;
   an uninstall method for uninstalling each install object and fileset by using means within each fileset and install object for uninstalling itself;
   a plurality of platform specific code modules for performing functions for any one of a plurality of operating systems that may be running on the computer system;
   means, within the install method, for calling a given platform specific code to perform platform specific operations on at least one of the filesets and install objects;
   means, within the given platform specific code for overriding install for a specific object of a fileset;
   means, within the uninstall method, for calling the given platform specific code to perform platform specific operations on at least one of the filesets and install objects; and
   means within the given platform specific code for overriding uninstall for a specific object of a fileset.

8. A computer system for installing a program onto computer storage of the computer:
   means for defining and building at least one fileset object;
   means for defining and building a plurality of install objects for each fileset; and
   means within each fileset object and install object for installing itself, uninstalling itself, logging itself to a file and recreating itself from a log file.

9. An install program, on a computer usable medium, comprising:
   at least one fileset object;
   a plurality of install objects for each fileset; and
   means within each fileset object and each install object for installing itself.

10. A computer system for installing a program onto computer storage of the computer:
    means for defining and building at least one fileset object;
    means for defining and building a plurality of install objects for each fileset; and
    means within each fileset object and install object for installing itself.

* * * * *